No. 725,978. PATENTED APR. 21, 1903.
G. W. MARBLE.
POWER TRANSLATING DEVICE.
APPLICATION FILED SEPT. 18, 1902.
NO MODEL. 3 SHEETS—SHEET 1.
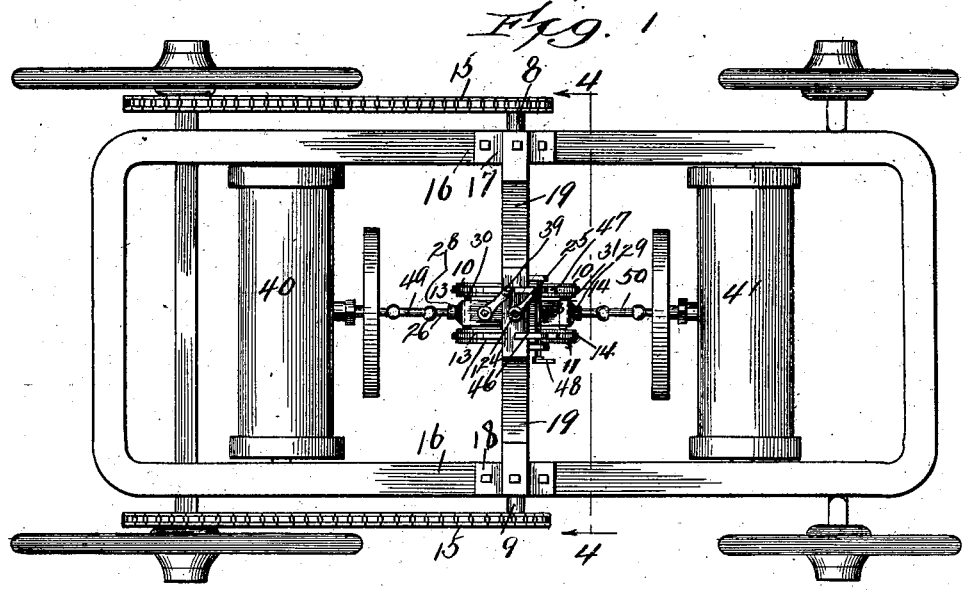
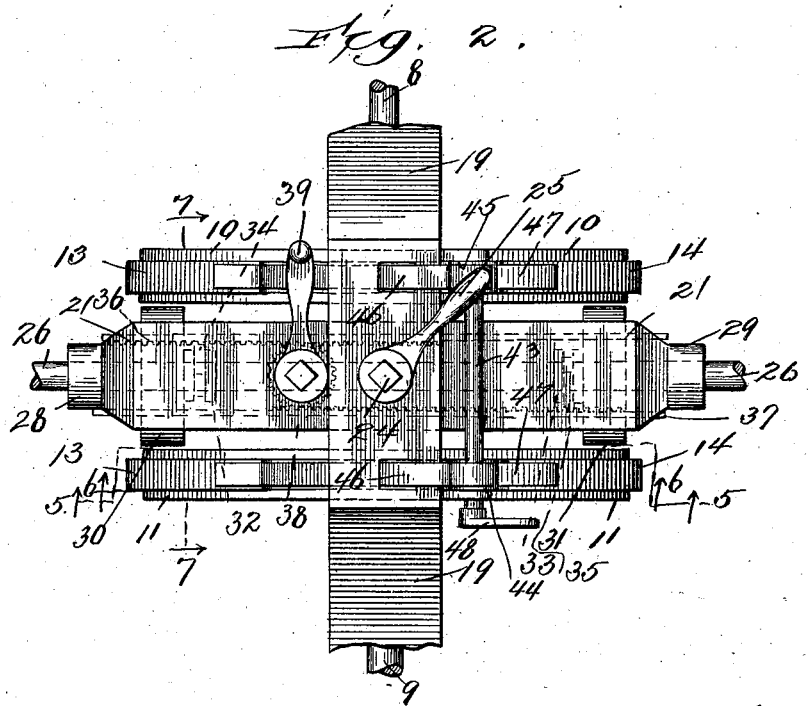
Witnesses:
Harry O. Leolite
Ray White
Inventor:
George. W. Marble.
By Force Bain
Atty.

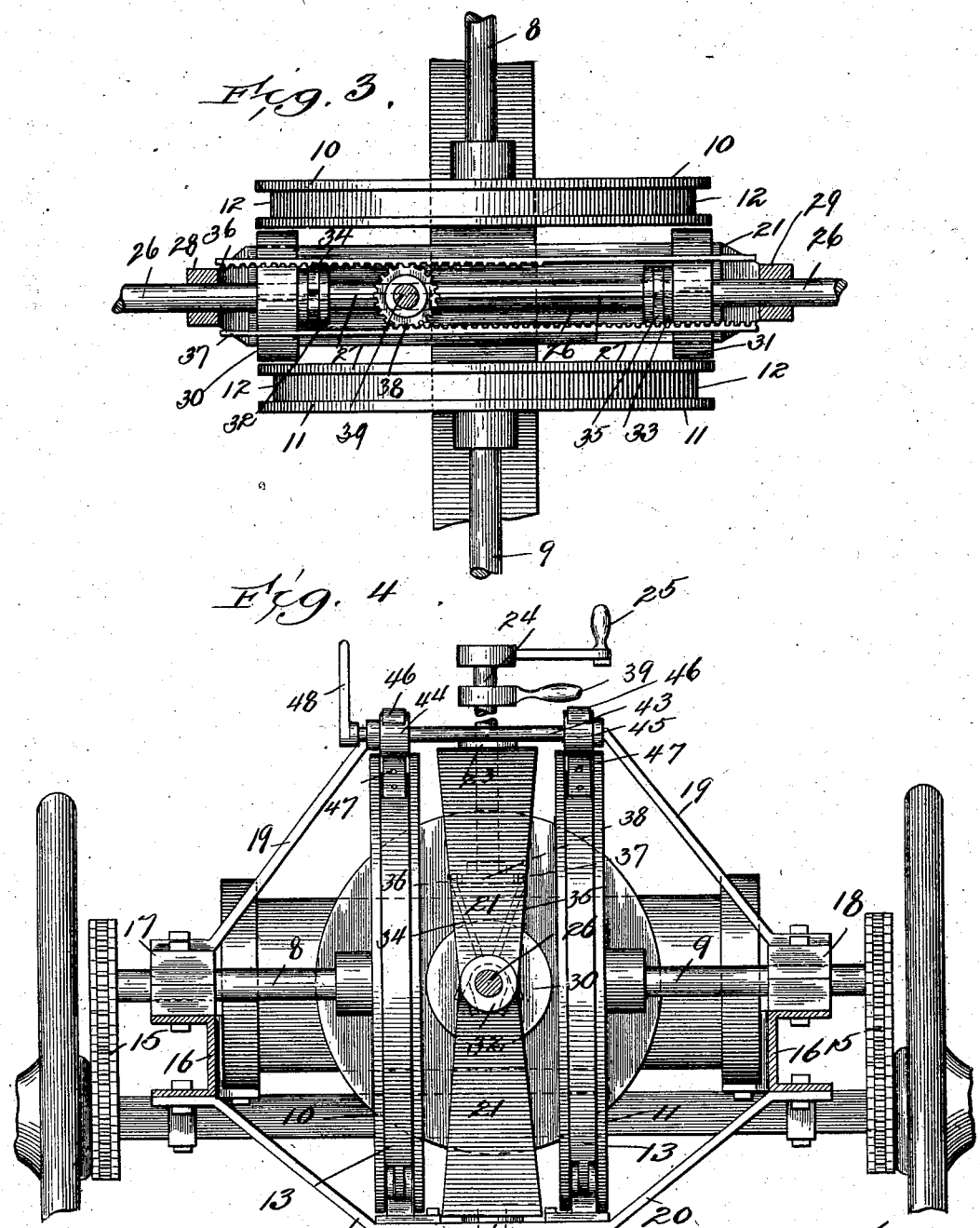

No. 725,978. PATENTED APR. 21, 1903.
G. W. MARBLE.
POWER TRANSLATING DEVICE.
APPLICATION FILED SEPT. 18, 1902.
NO MODEL. 3 SHEETS—SHEET 3.
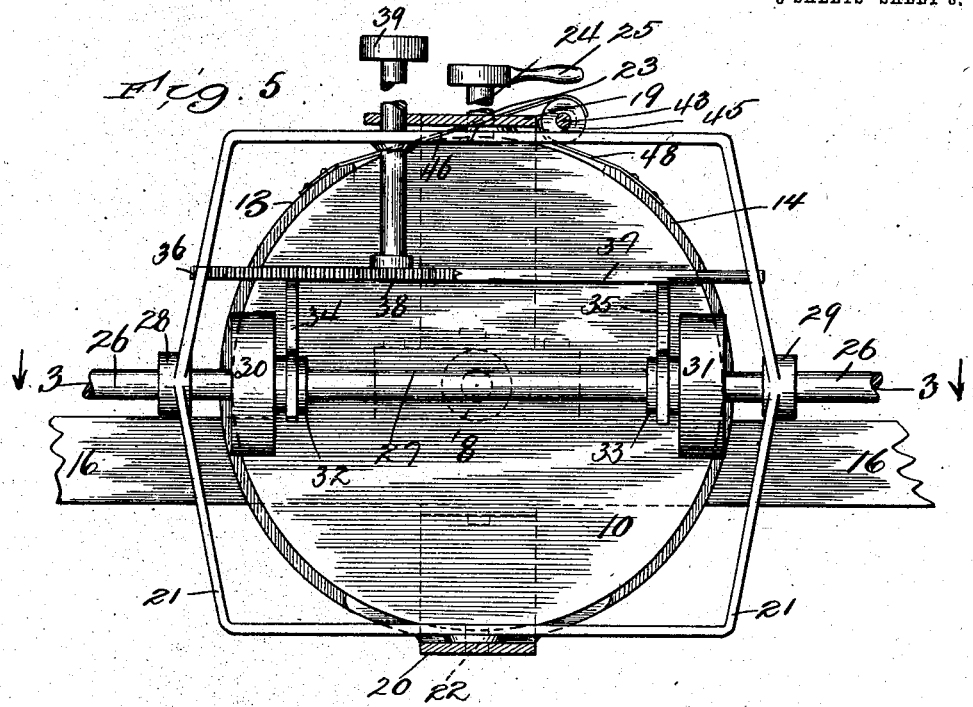
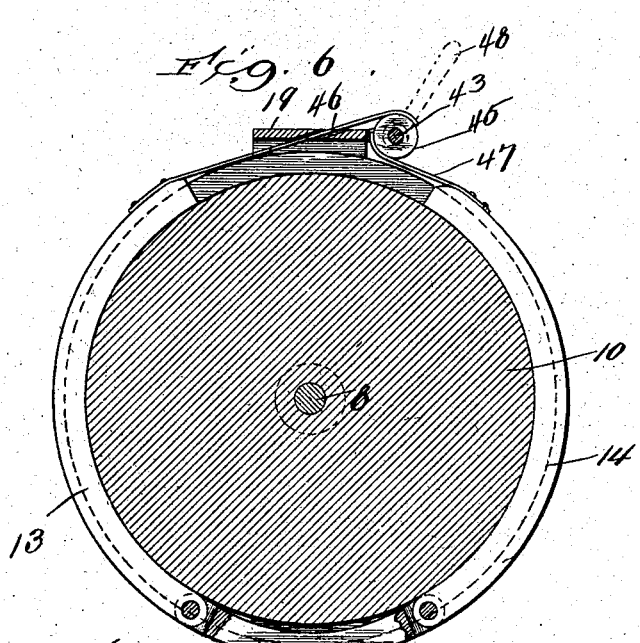
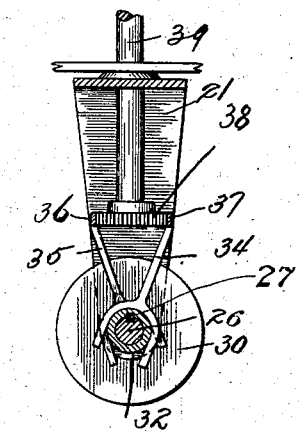
Witnesses:
Harry A. Leslie.
Ray White.
Inventor:
George W. Marble.
By Foree Bain, Atty.

UNITED STATES PATENT OFFICE.

GEORGE W. MARBLE, OF BUCHANAN, MICHIGAN, ASSIGNOR, BY MESNE ASSIGNMENTS, TO THE MARBLE-SWIFT AUTOMOBILE COMPANY.

POWER-TRANSLATING DEVICE.

SPECIFICATION forming part of Letters Patent No. 725,978, dated April 21, 1903.

Application filed September 18, 1902. Serial No. 123,829. (No model.)

*To all whom it may concern:*

Be it known that I, GEORGE W. MARBLE, of Buchanan, in the county of Berrien and State of Michigan, have invented certain new and useful Improvements in Power-Translating Devices; and I hereby declare that the following is a full, clear, and exact description thereof, reference being had to the accompanying drawings, which form part of this specification.

My invention relates to improvements in power-translating devices.

The object of my invention is to provide a power-translating device by means of which power from a prime mover operating at a practically constant velocity may be delivered to a driven mechanism at any desired speed within the compass of the source of power.

Another object of my invention is to provide a device of the class described whereby the direction of rotation of the driven mechanism may be quickly and conveniently reversed without changing the direction of rotation of the prime mover; and a still further object of my invention is to provide a means whereby the speed of rotation of the driven mechanism may be varied in gradually increasing and decreasing gradations, whereby the effective torque or turning effort of the driven mechanism is proportionately increased as the velocity thereof is decreased.

With these and other objects in view, which will readily become apparent to persons skilled in the art to which it appertains, my invention consists in the arrangement and combination of parts, as hereinafter pointed out, and specifically set forth in the appended claims.

An embodiment of my invention is disclosed in the accompanying drawings, in which—

Figure 1 represents a plan view of a motor-vehicle running-gear provided with my power-translating device. Fig. 2 is an enlarged broken-away plan view of the device. Fig. 3 is a section taken on line 3 3 of Fig. 5. Fig. 4 is an enlarged transverse section taken on line 4 4 of Fig. 1. Fig. 5 is a section taken on line 5 5 of Fig. 2. Fig. 6 is a section taken on line 6 6 of Fig. 2. Fig. 7 is a section taken on line 7 7 of Fig. 2.

In all of the views the same numerals of reference indicate similar parts.

The two coaxially-placed driven shafts 8 and 9 are adapted to be independently rotated by means of the friction-disks 10 and 11, which are placed in confronting positions and fixed to the respective shafts by any convenient means. The disks are each provided with annular grooves 12, made into their respective peripheries for the reception of brake-shoes 13 and 14. The shafts 8 and 9 may be directly connected to the traction-wheels of a self-propelling vehicle or they may be indirectly connected by any suitable power-transmitting medium, such as the chain 15 and suitable sprocket-wheels, when the device is to be used in connection with such driven machine.

The translating device is shown bodily supported upon the vehicle-frame 16, which for convenience is made of channel-iron. The shafts 8 and 9 are supported in bearings 17 and 18, respectively, and these are fixed to the frame 16 by suitable bolts. In practice the bearing should extend nearer to the hubs of the respective disks than shown to provide a rigid practical construction. A brace 19 rises from bearing 17, being fixed to the bearing 18. A similar lower brace 20 is fixed to opposite sides of the frame 16. A yoke-frame 21 is pivoted at 22 in the brace 20 and at 23 in the brace 19, upon which pivots it is capable of a slight oscillating motion. The pivot 24 is fixed to the said yoke and the handle 25 is provided for moving the yoke slightly on its bearings. A shaft 26 is provided with a longitudinal spline 27 between bearings and is provided with bearings 28 and 29 on the yoke 21. Driving friction-wheels 30 and 31 are mounted upon the shaft 26 and are each provided with positive driving engagement therewith by means of a feather carried by each wheel and which enters the spline 27, thereby permitting the said friction-wheels to be each moved longitudinally along the shaft 26. The friction-wheels 30 and 31 are provided with annular grooved hubs 32 and 33, respectively, into which forked downwardly-depending arms 34 and 35 engage. These arms are respectively connected to geared racks 36 and 37, which have sliding bearings in the yoke 21. They are reciprocated by rotating the geared pinion 38, a handle 39 being provided for that purpose, whereby the friction-wheels may each be coincidently reciprocated across the faces of the driven friction-disks 10 and 11. The friction-wheels 30 and 31 may be by this means quickly moved coincident from positions which they are shown to occupy in Fig. 5 to positions approaching the axial center of the confronting disks 10 and 11 and to any positions intermediate of these two extremes in either direction.

A slight rotary effort impressed upon the handles 25 will oscillate the frame 21, carrying the shaft 26 and the friction-wheels 30 and 31, until the said wheels are brought into driving contact with the face of the disks 10 and 11, respectively, at corresponding radial positions. If now the shaft 26 be rotated by a single source of power or by two sources of power, as exemplified by engines 40 and 41 in Fig. 1, then the friction-wheel 30 by making driving contact with disk 10 on one side of its axis will rotate disk 10 and shaft 8 in a given direction, and friction-wheel 31 by making driving contact with disk 11 on the opposite side of the common axis will rotate the disk 11 and accompanying shaft 9 in like direction. If now the impressed effort on handle 25 be applied in the opposite direction, the yoke 21 will be slightly rotated and both friction-wheels 30 and 31 will make contact with opposite disks. Then the shafts 8 and 9 will be reversed with reference to the direction in which they were previously rotated, and the vehicle by which they are driven will be propelled in the opposite direction.

Brackets 42 are fixed to the brace-frame 20, to which the brake-shoes 13 13 and 14 14 are pivoted. A shaft 43 is supported by brackets fixed to the brace-frame 19 and carries two small drums 44 and 45, around which straps 46 47 are wound when the handle 48 is slightly rotated for the purpose of applying the brake to prevent the rotation of the respective disks 10 11.

Engines 40 and 41 are connected to the shaft 26 by means of tumbling-shafts 49 and 50 to permit a slight displacement of shaft 26 when the yoke 21 is oscillated.

It is obvious that my device may be employed to drive a single shaft, either 8 or 9, and preserve all of the attendant benefits that obtain when two driven shafts are used, and it is also evident that the disks 10 and 11, when two are used, or either when used singly, may become the driver and that the shaft 26 may be driven thereby without departing from the spirit of my invention.

Having thus described my invention, what I claim, and desire to secure by Letters Patent, is—

1. In a power-translating device, the combination with a laterally-fixed friction-disk, of a shaft divided into two sections in a plane intercepting its axis, a flexible connection joining abutting ends of said sections, a movable shaft-supporting bearing at each end of the flexible section of said shaft, a structure carrying said bearings adapted and arranged to move said shaft, two friction-wheels carried directly upon said shaft, adapted and arranged to make peripheral contact with the face of the said disk on opposite sides of its axis of rotation, and a means for simultaneously moving the bearing-supports for deflecting said shaft to effect driving contact of one of said wheels with said disk and to remove the other wheel therefrom.

2. In a power-translating device, the combination with a laterally-fixed friction-disk, of a shaft divided into two sections in a plane intercepting its axis, a flexible connection joining abutting ends of said section, a movable shaft-supporting bearing at each end of the flexible section of said shaft, a structure carrying said bearings adapted and arranged to move said shaft, two friction-wheels carried directly upon said shaft adapted and arranged to make peripheral contact with the face of the said disk on opposite sides of its axis of rotation, a means for coincidently moving said wheels across the respective opposite radii of said disk, and a means for moving the bearing-supports for deflecting said shaft to effect driving contact of one of said wheels with said disk and to remove the other wheel therefrom.

3. In a power-translating device, the combination with two laterally-fixed confronting friction-disks, of a shaft divided into two sections in a plane intercepting its axis, a flexible connection joining abutting ends of said sections intermediate of said disks, a movable shaft-supporting bearing at each end of said shaft, a structure carrying said bearings adapted and arranged to move the flexible section of said shaft, two friction-wheels carried by said flexible section of said shaft adapted and arranged to make peripheral contact with the face of either of said friction-disks on opposite sides of their axis of rotation, and a means for moving the bearing-supports for deflecting said shaft, to effect driving contact of one of said wheels with one of said disks, and simultaneously effecting contact of the associated wheel with the other disk.

4. In a power-translating device, the combination with two laterally-fixed confronting friction-disks, of two intermediate wheels, each adapted and arranged to be placed in frictional rotatable contact with either of said disks, a shaft divided into two sections in a plane intercepting its axis, a flexible connection joining abutting ends of said sections, upon one section of which said wheels are mounted, a yoke arranged to be oscillated, shaft-supporting bearings for each end of said flexible section of said shafts carried by said yoke, and a means for oscillating said yoke to deflect said flexible section of said shaft and bearings for effecting contact of said wheels with said disks.

In testimony that I claim the foregoing as my own I affix my signature in presence of two witnesses.

GEORGE W. MARBLE.

In presence of—
GEO. P. SWIFT,
FORÉE BAIN.